United States Patent
Fraley

[11] 3,797,123
[45] Mar. 19, 1974

[54] PORTABLE PRECISION GOLF BALL SPHERICITY GAUGE

[76] Inventor: Thomas E. Fraley, 993 Nicklaus Dr., Rockledge, Fla. 32995

[22] Filed: Jan. 22, 1973

[21] Appl. No.: 325,341

[52] U.S. Cl................................ 33/178 B, 33/174 F
[51] Int. Cl............................ G01b 3/14, G01b 5/22
[58] Field of Search.......... 33/174 F, 178 B, 174 R, 33/178 R

[56] References Cited
UNITED STATES PATENTS

| | | | |
|---|---|---|---|
| 3,512,262 | 4/1970 | Smyk et al. | 33/178 B |
| 3,310,879 | 3/1967 | Brzezinski et al. | 33/178 B |

Primary Examiner—Louis R. Prince
Assistant Examiner—Richard R. Stearns

[57] ABSTRACT

A portable golf ball sphericity gauge comprising a hemispherical cup defining a hemispherical cavity corresponding to the shape of a hemispherical portion of a normally spherical standard size golf ball and being of slightly larger diameter than the diameter of the standard size golf ball.

5 Claims, 5 Drawing Figures

PATENTED MAR 19 1974  3,797,123

PORTABLE PRECISION GOLF BALL SPHERICITY GAUGE

BACKGROUND OF THE INVENTION

This invention relates to an improved gauge for testing the sphericity of a golf ball.

In normal use golf balls are subject to permanent deformation resulting from impact with golf clubs, pavements and other solid objects. The permanent deformation results in a golf ball which is no longer spherical, but is unbalanced to one side of the ball's normal center. The lack of sphericity of the golf ball frequency causes the ball to follow an unpredictable path when hit with a golf club or putter.

Various devices for testing the sphericity of a golf ball have been suggested past the part as illustrated by the following U.S. Pat. Nos.: 3,310,879 Brzezinski et al. Mar. 28, 1967; 3,512,262 Symk et al. May 19, 1970; 3,665,757 Houg May 30, 1972.

U.S. Pat. Nos. 3,310,879 and 3,665,757 disclose a ring gauge having an inside diameter which is the precise diameter of a standard golf ball. The golf ball is centered inside the ring and rotated until all major cross sections of the ball have been tested for roundness. The ring gauge requires that the person performing the test accurately judge when the ball is centered within the ring gauge and hold the ball centered while the ball is rotated. The acts of centering the ball and holding the ball centered are difficult to perform with accuracy by the average individual so that the ring gauge does not provide very accurate results.

U.S. Pat. No. 3,512,262 discloses a sphericity gauge having a circular top portion which defines a circular aperture which is of the diameter of a standard size golf ball and further provides a center support which is so shaped and positioned as to support a standard golf ball centered with respect to the center of the circular aperture. The gauge which U.S. Pat. No. 3,512,262 discloses thus provides for the accurate support of the golf ball centrally within the gauge. The gauge, however, still requires that a golf ball supported by the center support be rotated until all major circular cross sections through the center of the ball are passed through the circular aperture to detect deformation of the ball. Since the circular aperture of the gauge is of the exact diameter (1.68 inches) as a standard U.S. P. G. A. golf ball, testing has shown that many golf balls of nominally standard size cannot be rotated easily within the circular aperture. Any golf ball of slightly greater diameter, even one/one thousandth of an inch, cannot be rotated freely within the gauge

SUMMARY OF THE INVENTION

The present invention provides a portable golf ball gauge comprising a hemispherical cup defining a hemispherical cavity corresponding in shape with the hemispherical portion of a standard size normally spherical golf ball and having a major diameter which is slightly larger than the 1.68 inch diameter of a standard U.S. P.G.A. golf ball. When a golf ball is placed inside the cup it will seat in the cup provided the bottom half of the ball is hemispherical. If the bottom half of the ball is deformed and is not hemispherical the ball will not seat properly in the cup and the deformation of the bottom half of the ball may be visually detected. After the bottom half of the ball has been checked, it is merely required that the ball be rotated through 180° about any one axis while still positioned in the cup to test for deformation of the top half of the ball. The present invention thus provides a simple golf ball sphericity gauge which does not depend upon the manual dexterity of an operator to perform an accurate test.

These and other objects of the invention will become apparent from the following description and drawings, in which.

Figure 1:
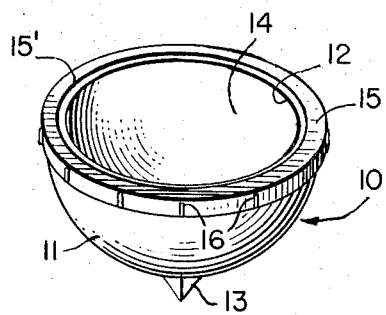
FIG. 1 is a perspective view of the invention.
Figure 2:
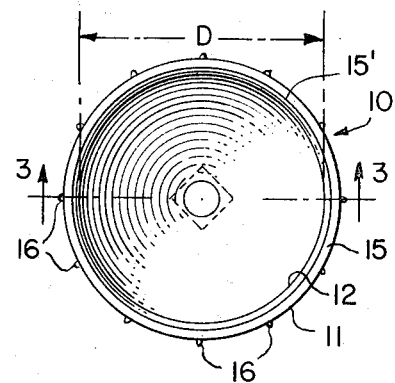
FIG. 2 is a top plan view of the invention.

Referring now to FIG. 1, the sphericity gauge of this invention is designated by the reference numeral 10 and comprises a hemispherical hollow cup 11 having a circular inner margin 12 and a depending base 13. The hemispherical cup 11 defines a hemispherical cavity 14 which is of the shape of a hemispherical portion of a spherical, standard size golf ball. The inner margin 12 defines a circular opening into the cavity 14 which is of a diameter D equal to 1.685 inches, slightly larger than the outside diameter of a normally spherical standard U.S. P.G.A. golf ball. The cup 11 has a radially outwardly extending annular rim 15 above the inner margin 12 which is provided with equally spaced vertical ribs 16 about its peripheral outer edge. The rim 15 and ribs 16 provide means to facilitate gripping the cup at its upper edge and also provide for decoration. The ribs 16 are spaced 30° apart and thus provide an angular gauge about the rim 12.

Figure 3:
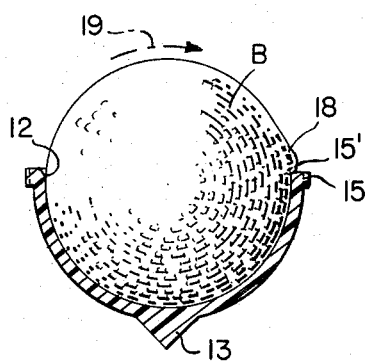
FIG. 3 is a vertical cross sectional view of the invention in a vertical plane along line 3—3 of FIG. 2 showing the outline of a deformed golf ball in test position.
Figure 4:
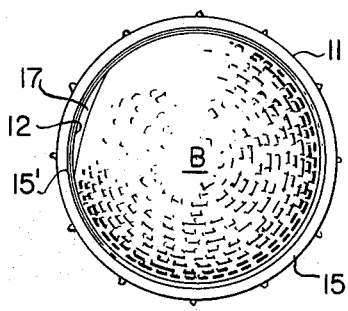
FIG. 4 is a top plan view of the invention showing the outline of another deformed golf ball in test position.
Figure 5:
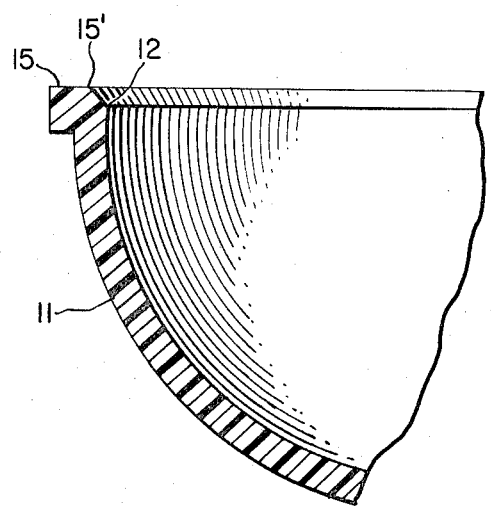
FIG. 5 is an enlarged fragmentary sectional view of the invention.

The use of the invention will be understood by reference to FIGS. 3 and 4. A person desiring to test a golf ball for sphericity will grasp the gauge 10 near the rim 15 between the thumb and forefinger of the left or right hand, and will then place the golf ball in the cavity 14 of the cup 11. If there is deformation of the ball B on its bottom half, the ball will not seat properly within the cup 11. The outer perimeter of the ball B at the margin 12 will therefore not coincide with the margin 12 which condition will be visually detected by the person performing the test. Such lack of coincidence will be evident by a gap 17 as shown in FIG. 4 between the margin 12 and the ball surface, or a bulge 18 as shown in FIG. 3.

After the bottom half of the ball B has been tested the ball need only be rotated through 180° to test the upper half. This places what was originally the first half of the ball tested on top and the second half of the ball on the bottom within the cup. Any deformation of the second half of the ball may be visually detected in the same manner previously described. Normally a deformed ball once deformation is detected is discarded and no further test is required.

The gauge 10 is preferably formed of a molded, rigid synthetic resinous material which will substantially retain its shape and size over the normal ambient temperature range found on a golf course. It should be sufficiently strong so that it does not break under normal use by a golfer. The gauge may be made of metal or other suitable materials having the above stated characteristics.

The major diameter of the cup 11 at the margin 12 is 1.685 inches and the top inner edge 15' of the rim 15 above the margin 12 preferably has an inside diameter of 1.689 inches, which is slightly larger than the diameter of the margin 12 in order to provide easy entrance of a golf ball into the cup. The rim 15 is bevelled downwardly from its top inner edge 15' to the inner margin 12. By making the major diameter D of the cup 11 slightly larger than the diameter of a normally spherical standard U.S. P.G.A. golf ball, the ball will fit easily within the cup 11 and may be rotated while seated within the cup. However, the deformation of a golf ball from true sphericity may be visually detected by observing the contour of the ball with respect to the margin 12. The larger size of the edge 15' allows better vision of the margin 12 and the ball B.

What is claimed is:

1. A golf ball sphericity gauge comprising a rigid hemispherical cup defining a hemispherical cavity of corresponding shape and slightly greater size with respect to the hemispherical portion of a normally spherical standard size golf ball, said cup having a circular inner margin at one end defining an open top for reception of a golf ball into said cup, the surface of said hemispherical cavity supporting the golf ball during gauging.

2. The gauge set forth in claim 1 wherein said cup has a radially outwardly projecting annular rim integral with and above said cup at said inner margin.

3. The gauge set forth in claim 2 wherein said rim is provided with equally spaced vertical ribs about its outer peripheral edge.

4. The gauge set forth in claim 2 wherein said rim has an interior diameter slightly larger than the diameter of said inner margin.

5. The gauge set forth in claim 4 wherein the interior diameter of said rim is substantially 1.689 inches, the diameter of said inner margin is substantially 1.685 inches, and the diameter of a standard size golf ball is substantially 1.68 inches.

* * * * *